(12) United States Patent
Jansen et al.

(10) Patent No.: US 7,459,210 B2
(45) Date of Patent: Dec. 2, 2008

(54) GRANULATED RAW MATERIAL FOR REFRACTORY PRODUCTS AND ALSO A PROCESS FOR THE PRODUCTION OF AND USE OF THE GRANULATED RAW MATERIAL

(75) Inventors: Helge Jansen, Friedland (DE); Iris Born, Duisburg (DE)

(73) Assignee: Refratechnik Holding GmbH, Ismaning (DE)

( * ) Notice: Subject to any disclaimer, the term of this patent is extended or adjusted under 35 U.S.C. 154(b) by 305 days.

(21) Appl. No.: 11/010,241

(22) Filed: Dec. 10, 2004

(65) Prior Publication Data
US 2007/0026230 A1    Feb. 1, 2007

(30) Foreign Application Priority Data
Dec. 22, 2003  (DE) ............................ 103 60 508

(51) Int. Cl.
   *B32B 5/16*   (2006.01)
(52) U.S. Cl. ....................................... 428/407; 501/99
(58) Field of Classification Search ............ 501/99–109; 428/407
See application file for complete search history.

(56) References Cited

U.S. PATENT DOCUMENTS

| | | | | |
|---|---|---|---|---|
| 3,637,412 A | * | 1/1972 | Felice et al. | 501/100 |
| 5,002,908 A | * | 3/1991 | Cassens, Jr. | 501/99 |
| 5,102,593 A | * | 4/1992 | Dotsch et al. | 264/669 |
| 5,413,744 A | * | 5/1995 | Bruckner et al. | 264/431 |

FOREIGN PATENT DOCUMENTS

RU       1531398 A1  *  1/1993

* cited by examiner

*Primary Examiner*—Carol Chaney
*Assistant Examiner*—Elizabeth Robinson
(74) *Attorney, Agent, or Firm*—Lackenbach Siegel, LLP

(57) ABSTRACT

The invention relates to a granulated raw material for refractory graphite-containing products in the form of shaped granules, with the granules each comprising a coarse resistor particle which is enveloped by a shell comprising graphite flocs and cured binder, in particular a carbon-containing binder. In addition, the invention relates to a process for producing the granulated resistor material and to the use of the granulated raw material.

44 Claims, 1 Drawing Sheet

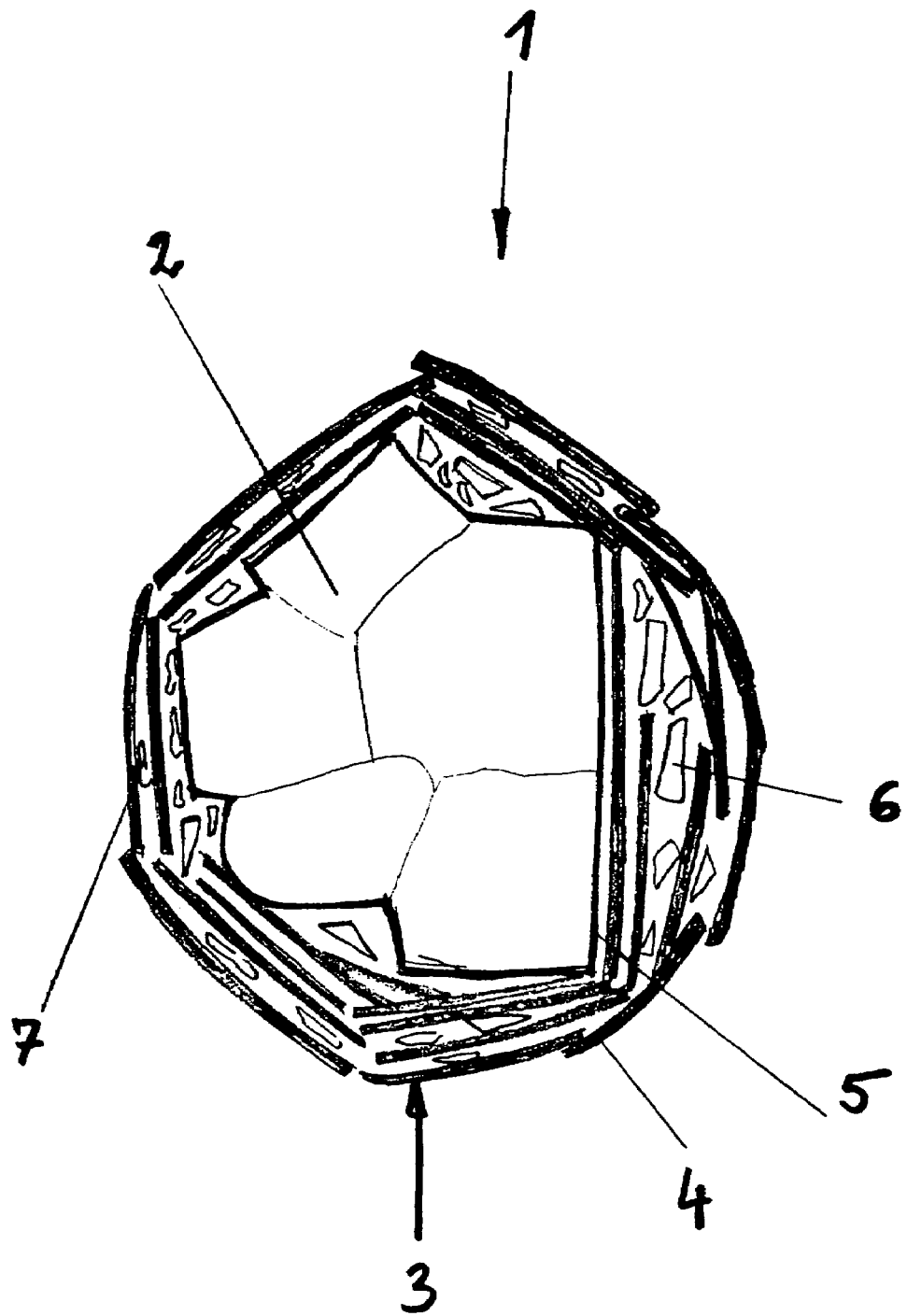

GRANULATED RAW MATERIAL FOR REFRACTORY PRODUCTS AND ALSO A PROCESS FOR THE PRODUCTION OF AND USE OF THE GRANULATED RAW MATERIAL

The invention relates to a granulated raw material for producing graphite-containing refractory products. The invention additionally relates to a process for producing the granulated raw material and its use.

Granulated raw materials comprising the known refractory raw materials, e.g. the resistor oxides or base oxides $SiO_2$, $Al_2O_3$, MgO, CaO, $Cr_2O_3$, SiC, $ZrO_2$ and mixtures thereof are generally processed by ceramic processes to produce graphite-containing refractory products. Here, grains or granules in particular particle size fractions are produced from crushed material by sieving and pressable and also vibratable or pourable mixes are produced by mixing according to raw material and particle size formulations with addition of flour-like material, binders and at least one graphitic carbon support and also, if appropriate, antioxidants and, if appropriate, water. In general, a plurality of particle size fractions, e.g. coarse fractions, intermediate fractions, fine material (<100 μm) and very fine material (<10 μm) are mixed to achieve, for example, very dense packing and to influence particular properties such as the thermal shock resistance.

The desired optimal mixing result for a mix is dependent, inter alia, on the particle shape of the granules. The mixing of splintery to cubic particles is less easy to calculate and control than that of more or less round particles, so that in the case of particles which are not round, the mixing result frequently has to be monitored experimentally and empirically. Fractions having predominantly round particles are generally not available, which is why the mixing process has to be carried out very carefully at a correspondingly high cost.

Splintery particle shapes also make the pressing of dense shaped bodies more difficult because they hinder the sliding of the particles in the particle matrix during pressing.

A further problem is created by granulated raw materials which are hydrophilic and swell or crumble on reaction with water and lose their ability to ensure the desired strength. These are, for example, granules comprising the hydratable raw materials magnesia, calcium oxide or calcined dolomite. These granulated raw materials require a not inconsiderable effort to suppress hydration, for example during storage or on mixing with water. Particularly in the production of water-containing mixes, e.g. in the production of refractory casting compositions for lining pouring ladles in secondary metallurgy, it has to be ensured that the granules do not hydrate.

In this context, it is known that in magnesia mixes the very fine magnesia particles which have the highest affinity for water compared to the coarser particle size fractions can be protected against hydration by coating the powder particles with an organosilane compound and heating them at from 350 to 500° C. The coating procedure is said to ensure a satisfactory hydration resistance by formation of an $SiO_2$ film on the surface of the particles (A. Kaneyosu, S. Yamamoto, T. Watanabe: MgO Raw Material Improved the Hydration Resistance. In: Proc. Unified Int. Tech. Conf. on Refr., Kyoto, Japan, 1995, pp. 533 to 540). However, the $SiO_2$ film is a type of foreign substance or an impurity in basic refractory systems and can impair the refractory properties.

Problems are also created by the homogeneous distribution of the graphite in raw material mixes, which is added as floc graphite in the form of natural graphite or synthetic graphite in amounts which give a residual carbon content in the application of, for example, above 2% by weight. The floc graphite which is very light compared to the other ingredients in the mix is not simple to manage in terms of its desired distribution in the mix. However, the mixing of the floc graphite in aqueous mixes, e.g. in the production of the abovementioned casting compositions, is particularly problematical. It is difficult to mix amounts of over 2% by weight of floc graphite with the other ingredients of the mix in the presence of water, since floc graphite is hydrophobic and tends to form a separate phase or float. A homogeneous distribution of the floc graphite cannot be achieved in such aqueous casting compositions without particular effort. In addition, the floc graphite also adversely affects the flow behavior of the casting compositions.

To solve the known problem in casting compositions, many attempts have been made to replace carbon-containing shaped refractory bodies by casting compositions, in particular in the region of the slag zone in pouring ladles (Chinas Refractories, vol. 9, No. 1, 2000, pages 8 to 11). Here, development was directed at improving the dispersibility of the graphite in water and the wettability with water by surface treatments of the graphite.

The surface of floc graphite has been coated with very fine SiC powder, for example by expensive high-speed impact processes, to give spherical graphite particles whose dispersibility and wettability were improved and which additionally led to an improved flow behavior of the casting composition. Since the bond between the SiC and the graphite particles was only weak, the SiC particles were rubbed off again during mixing with the coarser other raw material particles, so that the hoped-for result was not obtained in a satisfactory fashion.

The application of surface-active substances to the graphite particles is also known. Although this improves the dispersibility and wettability, the flow behavior, in contrast, is not favorably affected. In addition, the surface-active substances can disadvantageously alter the desired texture of the casting composition.

A further known method is to coat the graphite particle surface with, for example, a chelate compound of aluminum. Although the properties of the graphite can be altered in this way, no actually usable product results. The same applies to the known procedure of coating with $TiO_2$. These coated graphite products are, however, in each case of low value when the coating materials impair the refractory properties of the products.

Finally, mixing granulated refractory raw materials with floc graphite and binder, pressing the mixture and firing it and subsequently crushing the fired product is also known. Although the granulated material contains graphite, its distribution in the matrix of the granules is very inhomogeneous. In addition, the apparent porosity of the refractory products produced therefrom is higher than in the case of products which have been produced using previously known methods.

A further known process provides for micropellets or agglomerates to be formed from graphite or graphite together with fine oxide powders such as MgO, $SiO_2$ and $Al_2O_3$. The microparticles possibly improve the rheological properties of the casting compositions (I&SM Iron & Steelmaker, 186 Thorn Hill Road, Warrendale, Pa. 15086-7528, USA, October 2002, pages 48 to 51). This known process likewise does not lead to the floc graphite being able to be mixed simply and distributed homogeneously in casting compositions.

In addition, water-containing casting compositions suffer from the problem that the known antioxidants which also act as microstructure strengtheners and are generally used in the form of metal powders, e.g. Al, MgAl, Si powders, react with water so that they lose most of their known effects, in particular the prevention of oxidation of carbon, in particular of the graphite, and the strengthening of the microstructure of the matrix of the refractory product, so that the production of casting compositions having a high graphite content is still not achieved in a satisfactory fashion.

Furthermore, the antioxidants are added in relatively small amounts so that distributing them homogeneously is difficult.

The known route to a solution via the addition of pyrogenic silica or other reactive $SiO_2$ powders also leads to contamination and thus to poorer refractory properties and reduced corrosion and erosion resistance in basic refractory products.

It is an object of the invention to make it possible to control the introduction of graphite into refractory raw material mixes, in particular into water-containing refractory raw material mixes, in particular in a manner specific to the application, and to simplify the mixing in of graphite and also to improve the Theological properties of, in particular, water-containing graphite-containing raw material mixes. A further object of the invention is to protect hydratable refractory raw materials and/or hydrophilic refractory raw materials against an undesirable reaction with water or moisture or liquids.

This object is achieved by the features noted below. These features include, but are not limited to, granulated raw material for refractory graphite-containing products in the form of shaped granules, with the granules each comprising a coarse resistor particle which is enveloped by a shell comprising graphite flocs and cured binder, in particular a carbon-containing binder. These features also include, but are not limited to a process for producing a ganulated raw material comprising a granular resistor for refractory products, in particular for producing a granulated raw material as noted above which comprises the steps of: moistening the surface of the resistor particles of the granular resistor with a curable binder comprising a liquid phase, subsequently enveloping the resistor particles with floc graphite by mixing, forming coated granules from the enveloped particles, and then curing the binder. It is a further feature of the present invention to include the use of a granulated raw material introduced into water-containing vibratable compositions.

The invention solves the hydration and graphite mixing problem described and at the same time contributes to improving the Theological properties, in particular of water-containing vibratable or flowable raw material mixes.

All this is achieved by coating granular resistor particles with graphite flocs which adhere to one another and to the surface of the resistor particle, resulting in a novel granulated raw material which can be processed by ceramic processes, if appropriate together with further customary raw materials, to produce refractory products. According to the invention, a shell formed by graphite flocs which are localized by means of a binder and are aligned essentially in the direction of the particle surface and overlap in the manner of roofing tiles or lamellae or scales is present on a granular resistor particle. The graphite shell preferably surrounds the resistor particle completely and prevents moisture and/or water entering into a hydration reaction at the surface of the resistor particle. In addition, the three-dimensional shape of the novel raw material granules is essentially spherical because of a mixing and/or granulation process and thereby improves the miscibility of this raw material component with other raw materials and also the rheology, in particular of vibratable and casting compositions. Pressing to form shaped bodies gives greater compaction, because the graphite shell acts as a lubricant between the resistor particles and promotes the positioning of the resistor particles in a matrix to give the densest packing. In addition, the granulated raw material of the invention is free-flowing in the dry state because of the spherical shape of the granules and can thus be metered easily and optimum packing with like or different granule fractions can be calculated beforehand and produced in a controlled manner as a result of the regularity of the spherical particles.

It is surprising that the graphite shell also does not adversely affect mixing in aqueous systems, although the graphite is still hydrophobic. Gaps and/or the binder framework between the graphite flocs in the graphite shell in the surface region of the granules appear to act as capillaries and result in improved wettability, even though the shell also prevents penetration of water and/or moisture through to the surface of the resistor particle. In addition, it is surprising that the graphite flocs are bound firmly in the shell so that no appreciable abrasion, e.g. during mixing with the other ingredients of the raw material mix, occurs.

In a particular embodiment of the invention, the graphite/binder shell of the raw material granules of the invention comprises fine and/or very fine resistor particles, e.g. smaller than 0.5 mm, of at least one type of resistor, preferably the same type of resistor as the resistor particles, in predetermined amounts, advantageously incorporated so as to be homogeneously distributed. This is particularly advantageous when fine and/or very fine resistor particles which are known to have a strong affinity for water are to be used for the formulation of a refractory composition for a refractory product. The graphite/binder shell localizes and fixes the fine/very fine particles and at least largely prevents hydration. The raw material granules of the invention are therefore also suitable, in particular, for the production of water-containing vibratable or casting compositions.

In a further embodiment of the invention, the graphite/binder shell contains at least one finely divided antioxidant in a predetermined amount, in particular incorporated so as to be homogeneously distributed, so that the particles of the antioxidant are located where they are, in particular, to exert their antioxidizing action on the graphite and carbon of the binder and can do this optimally. The targeted placement of these materials in the graphite/binder shell results in the amounts added being able to be reduced.

The fine or very fine resistor particles and also the fine and/or very fine particles of the antioxidants have a synergistic effect in the graphite/binder shell in which they are localized and fixed between the graphite flocs and in the binder or with the binder. They support the flocs, in particular in the radial direction but also in the tangential direction of the spherical granules, and have a strengthening action in the binder framework, e.g. in a pyrolysis carbon framework or in the resite network of the binder, so that the graphite/binder shell is relatively rigid and a considerably improved abrasion resistance is obtained as a result.

One advantage of the invention is that the thickness of the graphite/binder shell and thus the amount of carbon, in particular the amount of graphite, can be regulated in the production process. It is firstly possible for a number of batches of a particular resistor particle fraction, e.g. the fraction from 2 to 4 mm, each coated with a different amount of graphite and/or binder to be produced and kept in stock. As an alternative, different resistor particle fractions, e.g. the fractions from 1 to 3 mm and from 2 to 4 mm, each coated with the same amount of graphite and/or amount of binder can be produced and kept in stock. From these, it is then possible to mix refractory raw material mixes which can be tailored individually or user-specifically in a simple fashion to meet the differing requirements of the users of the refractory products as early as in the production of the refractory products.

In the following, the invention will be described in more detail by way of example with the aid of the drawing.

The single FIGURE shows a cross section through a raw material granule 1 according to the invention. In the center or the interior of the granule 1 there is a splintery resistor particle 2, e.g. an MgO particle, as core which is surrounded by a graphite/binder shell 3 to form a spherical granule 1.

The resistor particle 2 is encased by graphite flocs 4 which interlock in the manner of scales and adhere via the binder to one another and to the surface 5 of the resistor particle 2, with the adhesive being, for example, a carbonized carbon framework (not shown). Fine or very fine resistor particles 6 and/or very fine antioxidant particles 7 are present between the flocs 4. The particles 6, 7, too, adhere to the flocs 4 and/or the surface 5 via, for example, the binder framework or the binder resite network and/or are embedded in the binder framework or the resite network.

As the fine/very fine particles, preference is given to using resistor flours or fractions having particle sizes (sieve analysis) of from 0 to 1 mm, in particular from 0 to 63 μm. The fineness of the antioxidants is, for example, from 30 to 100 μm, in particular from 40 to 100 μM.

The resistor particle sizes of the core of the granules are preferably in the range from 0 to 2 mm, in particular from 1 to 2 mm. As resistor particles and resistor flours, use is made of, for example, MgO, $Al_2O_3$, CaO, $MgAl_2O_4$, $ZrO_2$, SiC, $SiO_2$, $Cr_2O_3$ and mixtures thereof.

As antioxidants, use is made of, for example, flours comprising: Al, Si, $B_4C$, MgAl.

Fine/very fine particles of more than one type of resistor and/or very fine particles of more than one type of antioxidant, e.g. particles of MgO and CaO as resistor flour particles and/or particles of Al and $B_4C$ as antioxidant particles, can be present in the graphite shell 3. This variation makes it possible in a simple manner to achieve predeterminable properties of the graphite-containing raw material granules and/or to ensure particular properties of refractory products produced from the raw material granules.

The binder for binding the flocs to one another and for binding the flocs to the surface of the resistor particle and also for the fine/very fine particles is preferably a pyrolysis carbon framework of carbonized binder such as tar or pitch, the latter preferably in combination with carbon black, or natural resins and/or synthetic resins.

In the case of a pitch binder, mixing is, for example, carried out at temperatures of from 100 to 200° C. and heat treatment is subsequently carried out at from 250 to 300° C. In the case of synthetic resin as binder, use is made of, for example, pulverulent or liquid phenolic resins and solvent and coating is generally carried out cold or at temperatures below 100° C. and curing is carried out at temperatures of from 150 to 300° C., in particular from 160 to 250° C., as a result of which a high molecular weight and infusible resite network is formed by crosslinking.

Particularly abrasion-resistant granules can, for example, be produced as follows.

A pulverulent premix A of floc graphite and at least one pulverulent organic binder, e.g. a customary pulverulent synthetic resin, preferably a phenolic resin, e.g. a phenol-novolak resin, is firstly prepared by mixing, for example:

from 25 to 94% by weight, in particular from 45 to 83% by weight, of floc graphite (Graphite94, 500 μm)

from 6 to 75% by weight, in particular from 17 to 55% by weight, of novolak

One process variant according to the invention provides for a further premix B comprising a resistor flour component to be prepared. In this case, the following are mixed:

from 5 to 30% by weight, in particular from 5 to 15% by weight, of floc graphite (Graphit94, 500 μm)

from 2 to 15% by weight, in particular from 3 to 6% by weight, of novolak from 93 to 55% by weight, in particular from 92 to 79% by weight, of resistor flour having a particle size distribution from 0 to 90 μm, in particular from 0 to 63 μm.

A further premix C according to the invention can further comprise a fine resistor fraction up to, for example, a particle size of 1 mm, in particular 0.5 mm, for which purpose the following are mixed to form premix C:

from 5 to 30% by weight, in particular from 5 to 15% by weight, of floc graphite (Graphit94, 500 μm)

from 2 to 15% by weight, in particular from 3 to 6% by weight, of novolak from 42 to 25% by weight, in particular from 41 to 36% by weight, of resistor flour having a very fine particle size distribution from 0 to 90 μm, in particular from 0 to 63 μm from 51 to 30% by weight, in particular from 51 to 43% by weight, of a fine resistor fraction, e.g. a particle size fraction from 0 to 1 mm, in particular from 0.063 to 1 mm.

A further process variant according to the invention provides a premix D which corresponds to the premix A or B or C and additionally contains an antioxidant powder of customary fineness. Accordingly, advantageous premixes D have the following compositions:

D1:
from 24 to 89% by weight, in particular from 44 to 80% by weight, of floc graphite (Graphit94, 500 μm)

from 75 to 6% by weight, in particular from 55 to 17% by weight, of novolak from 1 to 5% by weight, in particular from 1 to 3% by weight, of antioxidant D2:
from 5 to 30% by weight, in particular from 5 to 15% by weight, of floc graphite (Graphit94, 500 μm)

from 2 to 15% by weight, in particular from 3 to 6% by weight, of novolak from 92 to 50% by weight, in particular from 91 to 76% by weight, of resistor flour having a very fine particle size distribution from 0 to 90 μm, in particular from 0 to 63 μm from 1 to 5% by weight, in particular from 1 to 3% by weight, of antioxidant D3:
from 5 to 30% by weight, in particular from 5 to 15% by weight, of floc graphite (Graphit94, 500 μm)

from 2 to 15% by weight, in particular from 3 to 6% by weight, of novolak from 41 to 22% by weight, in particular from 41 to 34% by weight, of resistor flour having a very fine particle size distribution from 0 to 90 μm, in particular from 0 to 63 μm from 51 to 28% by weight, in particular from 50 to 42% by weight, of a fine resistor fraction, e.g. a particle size fraction from 0 to 1 mm, in particular from 0.063 to 1 mm from 1 to 5% by weight, in particular from 1 to 3% by weight, of antioxidant Granular resistor particles of, for example, the following particle size fractions are coated with these essentially pulverulent premixes:

resistor particle size fraction I: from 0 to 1 mm, in particular from 0.063 to 1 mm resistor particle size fraction II: from 0 to 2 mm, in particular from 1 to 2 mm resistor particle size fraction III: from 0 to 4 mm, in particular from 2 to 4 mm Coating is advantageously carried out in a high-intensity mixer by firstly moistening the surface of the resistor particles, e.g. a resistor particle size fraction or a plurality of resistor particle size fractions if a plurality of fractions are to be coated simultaneously or in the same way, with, for example, if synthetic resins are used, a liquid solvent for the synthetic resin powder, for example with an ethylene glycol such as monoethylene glycol or diethylene glycol when novolak is used.

The pulverulent premix is subsequently added. Mixing results in coating and the formation of granules in the manner of dusting, i.e. mixing is carried out so that the pulverulent premix does not clump together but instead collects on the moist surface. Mixing is continued until the surface of the dusted granules is relatively dry and no more powder adheres to it.

The synthetic resin binder powder is obviously dissolved or at least partly dissolved or made sticky by the solvent and binds the constituents of the premix together and to the surface of the resistor particle.

The amount of coating on the resistor particles can be controlled according to the invention, for example firstly via the amount of solvent added and/or via the type of solvent used. Secondly, the amount of the coating can be regulated by means of stepwise dusting, by repeating the moistening of the surface of the granules at least once after drying and subsequently, in each case, dusting it again.

In a particular embodiment of the invention, the granules produced in the high-intensity mixer are after-granulated in a specific granulation apparatus, e.g. on a pelletizing pan, resulting in particularly spherical particles. In addition, after-granulation effects additional densification and strengthening of the granule shell and also a narrowing of the particle size distribution of the granules.

The granules are subsequently, when synthetic resins are used, heated at from 160 to 300° C., in particular from 160 to 250 ° C., during which solvents are driven off and strengthening of the binder is effected by resite network formation.

The process of the invention makes it possible to produce granules which have, for example, the following composition:

from 5 to 30% by weight, in particular from 15 to 30% by weight, of resistor particle material (from 0 to 2 mm, in particular from 1 to 2 mm)

from 5 to 30% by weight, in particular from 5 to 15% by weight, of floc graphite from 37 to 7% by weight, in particular from 35 to 20% by weight, of resistor flour material (from 0 to 90 μm, in particular from 0 to 63 μm)

from 0 to 5% by weight, in particular from 0 to 3% by weight, of antioxidants from 2 to 15% by weight, in particular from 3 to 6% by weight, of binder from 0 to 4% by weight, in particular from 0 to 2% by weight, of carbon black from 45 to 9% by weight, in particular from 42 to 24% by weight, of fine resistor particles, from 0 to 1 mm, in particular from 0.063 to 1 mm It is particularly advantageous to produce granules based on hydratable resistor materials such as MgO, CaO, CaO/MgO, by the process of the invention because these materials are protected by the graphite/binder shell, and in fact not only the resistor particles but also the fine to very fine particles of the resistor flours or fine resistor materials and the antioxidants are protected this way.

It is also particularly advantageous to use synthetic resins and natural resins as binders. As synthetic resin, preference is given to using phenolic resin in combination with the solvents monoethylene glycol and/or diethylene glycol, because the solvents are very reactive and bind the pulverulent constituents of the premix in a short time.

The following example illustrates the process of the invention by means of which particularly abrasion-resistant granules can be produced.

The objective is to produce granules according to the invention having particle sizes in the range from 3 to 5 mm from an MgO particle fraction having particle sizes in the range from 1 to 3 mm. For this purpose, the following premix is prepared:

30% by weight of magnesia flour

40% by weight of fine magnesia particles (from 0.063 to 1 mm)

10% by weight of floc graphite

2% by weight of Al powder (antioxidant)

4% by weight of novolak powder

Mixing of these materials is carried out in a high-intensity mixing apparatus, e.g. in countercurrent in a pin mixer.

The resistor particles are subsequently introduced in countercurrent into another high-intensity mixing apparatus, e.g. a star mixer, and, while mixing, an amount of the total solvent, e.g. diethylene glycol, provided which is just sufficient to wet the particle surface of the coarse resistor particles is added. A predetermined portion of the premix is subsequently added and mixed in such a way that the powder particles of the premix are deposited on the surface of the coarse resistor particles. Mixing is carried out until the surface of the granules is dry or no longer binds any fine particles of the premix. Wetting with solvent is then repeated while mixing and another defined portion of the premix is added.

When the granules have been coated with the total amount of solvent provided and the predetermined amount of dry fine particles of the premix, the granules are taken from the mixer and, for example, after-granulated on a pelletizing pan.

The granules are subsequently heated at temperatures of 180° C. for 2 hours and then cooled. This results in granules which correspond to the granules depicted in the drawing.

It is within the scope of the invention to produce the granules by applying the constituents of the shell in succession after moistening either individually or in the form of a plurality of different premixes, so that, for example, a shell akin to the layers of an onion is built up. For example, premixes composed of graphite and binder powder, of binder powder and fine and/or very fine particles, of binder powder and antioxidant and of binder powder and fine and/or very fine particles and antioxidants can be produced and these mixtures can be applied in succession by dusting after renewed moistening.

The invention claimed is:

1. A granulated raw material for refractory graphite-containing products in the form of shaped granules, with the granules each comprising:

a coarse resistor particle which is enveloped by a shell comprising graphite flocs and cured binder, in which fine and/or very fine resistor particles are fixed between the graphite flocs and in the binder; and wherein the graphite flocs are arranged in the shell in the manner of interlocking scales extending essentially in the circumferential direction of the granule.

2. The granulated raw material as claimed in claim 1, wherein the coarse resistor particle comprises:

at least one of the refractory oxides $SiO_2$, $Al_2O_3$, MgO, CaO, $Cr_2O_3$, SiC, $ZrO_2$.

3. The granulated raw material as claimed in claim 1, wherein the granules are spherical.

4. The granulated raw material as claimed in claim 1, wherein fine and/or very fine resistor particles, are embedded in the shell.

5. The granulated raw material as claimed in claim 4, wherein the resistor type of the very fine and/or fine resistor particles is identical to the resistor type of the coarse resistor particle.

6. The granulated raw material as claimed in claim 4, wherein the resistor type of the very fine and/or fine resistor particles is a resistor type different from the resistor type of the coarse resistor particle.

7. A granulated raw material as claimed in claim 4, wherein the resistor particles are of the resistor type identical to the resistor type of the coarse resistor particle.

8. The granulated raw material as claimed in claim 1, wherein antioxidant particles of at least one type of antioxidant are embedded in the shell.

9. A granulated raw material as claimed in claim 8, wherein:
the antioxidant particles of at least one type of antioxidant are embedded between graphite flocs and the resistor particles; and
wherein the resistor particles are particles selected from a group containing fine and very fine resistor particles.

10. The granulated raw material as claimed in claim 1, wherein carbon black particles are incorporated in the shell.

11. The granulated raw material as claimed in claim 1, wherein the binder comprises a pyrolysis carbon framework.

12. The granulated raw material as claimed in claim 1, wherein the binder comprises a synthetic resin network.

13. The granulated raw material as claimed in claim 1, wherein the binder, binds the graphite flocs to one another and to the surface of the resistor particle.

14. The granulated raw material as claimed in claim 1, wherein the binder, binds fine and/or very fine resistor particles.

15. The granulated raw material as claimed in claim 1, wherein the binder, binds antioxidant particles.

16. The granulated raw material as claimed in claim 1, wherein the fine and/or very fine resistor particles are homogeneously distributed in the shell.

17. The granulated raw material as claimed in claim 1, wherein the antioxidant particles are homogeneously distributed in the shell.

18. The granulated raw material as claimed in claim 1, wherein the granulated raw material has the following composition:
from 5 to 30% by weight, of resistor particle material (of less than or equal to 2 mm in particle size)
from 5 to 30% by weight, of floc graphite
from 37 to 7% by weight of resistor flour material (of less than or equal to 90 μm in particle size)
from 0 to 5% by weight of antioxidants;
from 2 to 15% by weight of binder;
from 0 to 4% by weight of carbon black; and
of 45 to 9% by weight of fine resistor particles, from less than or equal to 1 mm in particle size.

19. The granulated raw material as claimed in claim 18, wherein the coarse resistor particles have particle sizes of less than or equal to 2 mm.

20. The granulated raw material as claimed in claim 18, wherein the floc graphite has the following dimensions:
floc diameter: from 0 to 120 mesh.

21. The granulated raw material as claimed in claim 18, wherein the very fine resistor flour has particle sizes of less than or equal to 1 mm.

22. The granulated raw material as claimed in claim 21, wherein the resistor flour has a particles size of less than or equal to 63 μm.

23. The granulated raw material as claimed in claim 18, wherein the fine resistor material has particle sizes from 0.063 to 1 mm.

24. The granulated raw material as claimed in claim 18, wherein the antioxidant has particle sizes of less than or equal to 100 μm.

25. A granulated raw material as claimed in claim 18, wherein: the resistor particle material is from 15 to 30% by weight.

26. A granulated raw material as claimed in claim 18, wherein the granulated raw material is resistor particle material from 1 to 2 mm in particle size.

27. A granulated raw material as claimed in claim 18, wherein the floc graphite is from 5 to 15% by weight.

28. A granulated raw material as claimed in claim 18, wherein the granulated raw material is resistor flour material of less than or equal to 63 μm in particle size.

29. A granulated raw material as claimed in claim 18, wherein the resistor flour material is from 35 to 20% by weight.

30. A granulated raw material as claimed in claim 18, wherein the granulated raw material has from 0 to 3% by weight of antioxidants.

31. A granulated raw material as claimed in claim 18, wherein the granulated raw material has from 3 to 6% by weight of binder.

32. A granulated raw material as claimed in claim 18, wherein the granulated raw material has from 0 to 2% by weight of carbon black.

33. A granulated raw material as claimed in claim 18, wherein the granulated raw material has from 42 to 24% by weight of fine resistor particles.

34. A granulated raw material as claimed in claim 18, wherein the granulated raw material has from 0.063 to 1 mm in particle size of fine resistor particles.

35. A granulated raw material as claimed in claim 20, wherein the floc graphite has a floc diameter from 0 to 100 mesh.

36. The granulated raw material as claimed in claim 1, wherein the granulated raw material comprises a hydrophilic resistor.

37. The granulated raw material as claimed in claim 18, wherein:
the resistor particle material is from 15 to 30% by weight,
the floc graphite is from 5 to 15% by weight, and
the resistor flour material is from 35 to 20% by weight.

38. The granulated raw material as claimed in claim 1, wherein the granules have a particle size of less than or equal to 10 mm.

39. A granulated raw material as claimed in claim 38, wherein the granules have a particle size of from 0.063 to 5 mm.

40. The granulated raw material as claimed in claim 1, wherein the granules have a bulk density of from 1.10 to 1.70 g/cm$^3$.

41. A granulated raw material as claimed in claim 40, wherein the granules have a bulk density of from 1.20 to 1.40 g/cm$^3$.

42. The granulated raw material as claimed in claim 36, wherein: the granulated raw material comprising the resistor is hydratable.

43. The granulated raw material as claimed in claim 1, wherein the antioxidant comprises Al and/or Si and/or MgAl or $B_4C$.

44. A granulated raw material as claimed in claim 1, wherein the cured binder is a carbon-containing binder.

* * * * *